United States Patent
Wargo et al.

(10) Patent No.: US 8,342,313 B2
(45) Date of Patent: Jan. 1, 2013

(54) ACCUMULATION-AND-RELEASE CONVEYOR

(75) Inventors: Stephen G. Wargo, Laurel, MD (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 231 days.

(21) Appl. No.: 12/666,408

(22) PCT Filed: Jul. 15, 2008

(86) PCT No.: PCT/US2008/070062
§ 371 (c)(1), (2), (4) Date: Dec. 23, 2009

(87) PCT Pub. No.: WO2009/014937
PCT Pub. Date: Jan. 29, 2009

(65) Prior Publication Data
US 2010/0193329 A1    Aug. 5, 2010

Related U.S. Application Data

(60) Provisional application No. 60/951,646, filed on Jul. 24, 2007.

(51) Int. Cl.
*B65G 47/26* (2006.01)
(52) U.S. Cl. .................... 198/419.1; 198/459.6
(58) Field of Classification Search ............ 198/345.1, 198/419.1, 459.6, 459.7
See application file for complete search history.

(56) References Cited

U.S. PATENT DOCUMENTS

| | | | |
|---|---|---|---|
| 3,568,823 A * | 3/1971 | Rettig et al. ............... | 198/419.1 |
| 4,262,794 A | 4/1981 | Bourgeois | |
| 4,962,625 A * | 10/1990 | Johnson, Jr. et al. ........... | 53/157 |
| 5,038,921 A | 8/1991 | Hoppmann et al. | |
| 6,019,211 A * | 2/2000 | Masciarelli, Jr. ........... | 198/345.1 |
| 6,131,372 A * | 10/2000 | Pruett .............................. | 53/448 |
| 6,189,679 B1 * | 2/2001 | Grinder ..................... | 198/419.1 |
| 6,234,292 B1 | 5/2001 | Schut | |
| 6,439,369 B1 * | 8/2002 | Brown ....................... | 198/459.6 |
| 7,040,480 B2 | 5/2006 | Sedlacek | |
| 7,111,722 B2 | 9/2006 | Burch | |
| 7,147,097 B2 | 12/2006 | Lemm | |
| 7,185,752 B2 * | 3/2007 | Hakansson ............... | 198/419.1 |
| 7,249,671 B2 | 7/2007 | Riddick et al. | |
| 7,270,054 B2 * | 9/2007 | Bobren et al. .................. | 100/26 |

(Continued)

FOREIGN PATENT DOCUMENTS

DE     8436734 U     7/1985
(Continued)

*Primary Examiner* — Joseph A Dillon, Jr
(74) *Attorney, Agent, or Firm* — James T. Cronvich

(57) ABSTRACT

An accumulation-and-release conveyor using a roller belt with rollers arranged to rotate in the direction of belt travel. The rollers extend through the thickness of the belt. A movable stop is positioned along the carryway just downstream of a bearing surface that is movable into and out of contact with the rollers. When the bearing surface is out of contact with the rollers, they are freely rotatable; when the bearing surface contacts the rollers, they roll on the bearing surface to propel articles in the direction of belt travel. The stop is selectively moved between a blocking position preventing articles from passing and accumulating them with low back line pressure on the freely rotatable rollers and a release position allowing articles to pass to the accumulation zone where they are propelled forward and separated from each other by the rotation of the rollers rolling on the bearing surface.

9 Claims, 3 Drawing Sheets

U.S. PATENT DOCUMENTS

| | | |
|---|---|---|
| 7,311,192 B2 | 12/2007 | Fourney |
| 7,344,018 B2 | 3/2008 | Costanzo et al. |
| 7,426,992 B2 * | 9/2008 | Fourney ........................ 198/779 |
| 7,506,750 B2 | 3/2009 | Costanzo et al. |
| 7,527,145 B2 | 5/2009 | Zubair et al. |
| 7,617,923 B2 * | 11/2009 | Riddick et al. ............ 198/457.05 |
| 7,770,718 B2 * | 8/2010 | Fourney ..................... 198/803.9 |
| 7,926,647 B2 * | 4/2011 | Fourney ..................... 198/803.9 |
| 8,161,854 B2 * | 4/2012 | Fourney ............................. 83/39 |
| 2008/0121498 A1 | 5/2008 | Costanzo et al. |

FOREIGN PATENT DOCUMENTS

JP  8-277029 A1  10/1996

* cited by examiner

ACCUMULATION-AND-RELEASE CONVEYOR

BACKGROUND

The invention relates generally to power-driven conveyors and, more particularly, to conveyors using conveyor belts with article-supporting rollers rotatable in the direction of belt travel to accumulate and selectively release accumulated articles and methods for their operation.

Conveyors are used in industrial applications to transport articles from one processing station to another. Often a continuously moving conveyor belt is used to deliver articles to a downstream processing station. As soon as the supply of articles exceeds the handling capacity of the downstream processing station, the articles begin to back up at a stopping mechanism blocking the conveyor at a position upstream of the processing station. Friction between the conveying surface of the moving belt and the backed-up, or accumulated, articles causes the articles to push against each other. The pressure exerted against the article at the front of the group of accumulated articles is called back line pressure. As more articles back up, the back line pressure increases. Back line pressure can cause damage to the articles, excessively load the conveyor belt and its drive components, and accelerate belt wear. Zone accumulation, in which a series of separately driven conveyors can be stopped and started depending on the downstream demand and upstream supply of articles, is used to eliminate back line pressure. But zone accumulation requires multiple drives and sensors, which can be costly, and, between consecutive conveying zones, transfers, at which articles are susceptible to tipping.

Roller-top belts with freely rotatable rollers in rolling contact with the undersides of conveyed articles are often used to reduce friction and lower back line pressure. The roller-top belts are typically followed by an indexing conveyor with a high-friction conveying surface that stops to serve as a stop mechanism and allow upstream articles to accumulate with low back line pressure atop the rollers of the roller-top belt and starts to release articles for delivery downstream. Like zone accumulation, this arrangement requires separately driven conveyors and suffers from some of the other shortcomings.

Thus, there is a need for a conveyor that can accumulate and release conveyed articles without the shortcomings of zone accumulators and separate accumulation and indexing conveyors.

SUMMARY

These shortcomings are overcome by an accumulation-and-release conveyor embodying features of the invention. According to one aspect of the invention, a conveyor comprises a conveyor belt advancing in a direction of belt travel from an upstream end to a downstream end. The conveyor belt includes rollers that extend through the thickness of the conveyor belt and that can rotate in the direction of belt travel. A movable stop positioned along the conveyor belt moves between a blocking position blocking conveyed articles and a release position allowing articles to pass. A movable bearing surface disposed below the conveyor belt upstream of the movable stop is selectively movable into and out of contact with the rollers from below. When in contact with the rollers, the bearing surface causes them to rotate by frictional rolling contact as the conveyor belt advances. The rollers in the conveyor belt not contacting the movable stop are freely rotatable.

In yet another aspect of the invention, a method for conveying objects comprises: (a) conveying articles atop article-supporting rollers in a conveyor belt advancing in a direction of belt travel upstream to downstream; (b) selectively moving a stop to block and release articles conveyed on the conveyor belt at a blocking position along the conveyor; (c) selectively moving a bearing surface into contact with the rollers just upstream of the blocking position to cause the rollers in contact with the bearing surface to propel articles atop the rollers forward along the advancing conveyor belt; and (d) coordinating the movement of the bearing surface with the movement of the stop.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
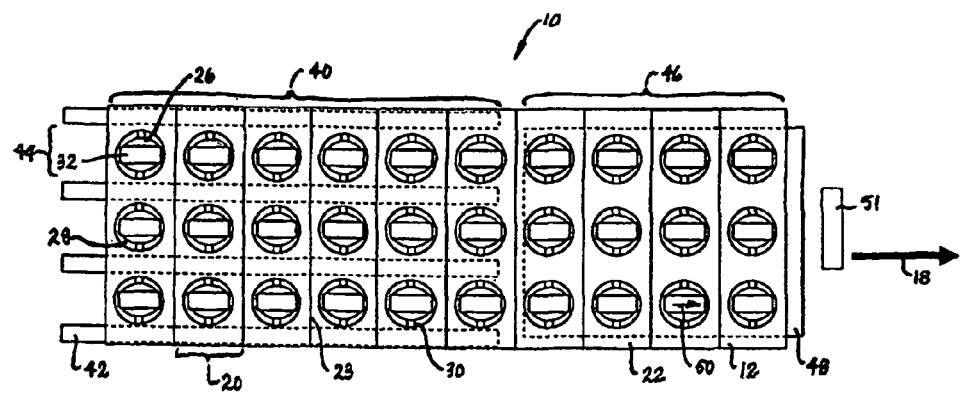
FIG. 1 is a top plan view of an accumulation-and-release conveyor embodying features of the invention.
Figure 2A:
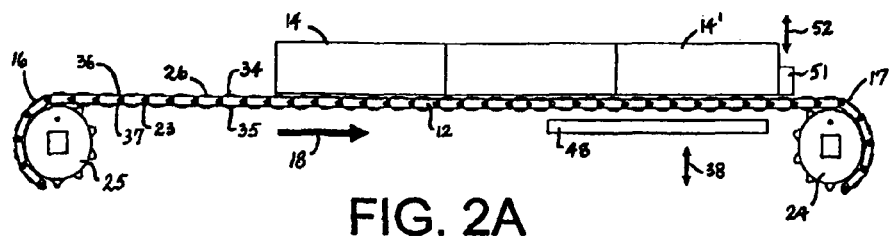
FIGS. 2A-2C are side elevation views of the conveyor of FIG. 1, showing its sequence of operation.

One version of a conveyor embodying features of the invention is shown in FIGS. 1 and 2A. The figures depict an upper carryway portion 10 of a belt conveyor using a conveyor belt 12 to convey articles 14 along the carryway from an upstream end 16 to a downstream end 17 in a direction of belt travel 18. The preferred conveyor belt is a modular plastic conveyor belt constructed of rows 20 of belt modules 22 connected together at hinge joints 23 that allow the belt to articulate about drive 24 and idle 25 sprockets at the downstream and upstream ends of the carryway. Rollers 26 are retained in cavities 28 formed in the belt by axles 30 spanning the cavities. The axles, which extend through bores in the rollers, are oriented in the width direction of the conveyor belt—perpendicular to the direction of belt travel. This allows the rollers to rotate in the direction of belt travel about the axes of the axles. The rollers shown are generally spherical in shape with a raised tread 32 along the equator defining the diameter of the roller. The periphery of the tread may be coated with or formed by an elastomeric or rubber-like material to provide a high-friction characteristic for a better grip. The diameter of the rollers exceeds the thickness of the conveyor belt so that salient portions 34, 35 of the rollers extend past the outer conveying surface 36 and the opposite inner surface 37 of the belt.

The carryway is divided into two zones. In an upstream zone 40, the belt is supported atop parallel support rails 42 contacting the inner surface of the belt between longitudinal columns 44 of rollers. (The support rails are omitted from FIG. 2A for clarity.) In this upstream zone, the rollers, out of contact with carryway structure, are free to rotate on their axles. In a downstream zone 46, the rollers are underlain by a selectively movable bearing surface 48. The bearing surface shown may be moved into and out of contact with the rollers by means of hydraulic, pneumatic, electromagnetic, or mechanical actuators arranged to raise and lower, for example, the bearing surface as indicated by arrow 38. As the belt advances the direction of belt travel, the salient portions of the rollers extending past the inner belt surface frictionally contact the bearing surface when it is raised. The frictional contact causes the rollers to rotate on their axes with the salient portions of the rollers extending past the outer article-conveying surface of the belt rotating as indicated by arrow 50 in the direction of belt travel. An article supported atop the rotating rollers in the downstream zone is propelled along the carryway in the direction of belt travel at an absolute speed of twice the speed of the belt, or at a speed, relative to the outer conveying surface, equal to the belt speed, if there is no slip between the rollers and the bearing surface and between the rollers and the conveyed article.

Figure 2B:
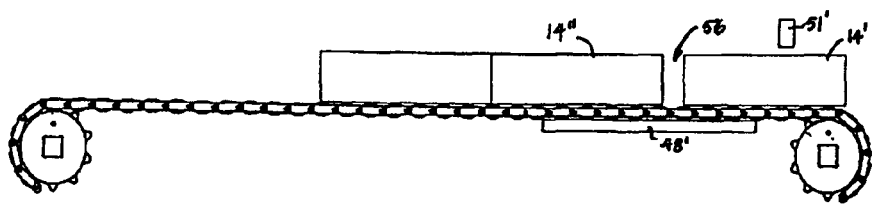
Figure 2C:
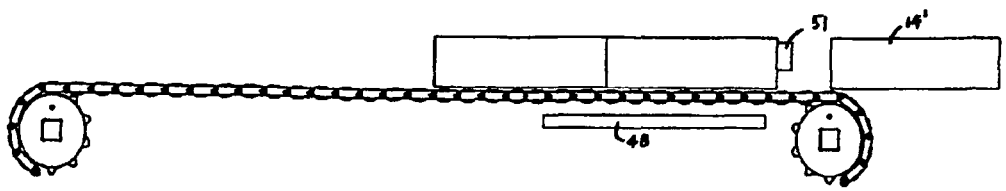

The operation of the conveyor and the selectively movable bearing surface is illustrated in the sequence of FIGS. 2A-2C. In FIG. 2A, a selectively movable stop 51 is shown in a blocking position preventing articles 14 from advancing further downstream. When the stop is in a blocking position, the bearing surface 48 is lowered out of contact with the belt rollers so that they can rotate freely. The articles back up upstream of the leading article 14'. The freely rotatable rollers in the article-accumulating zone rotate in low-friction rolling contact with the blocked articles to reduce back line pressure on the accumulated articles. As shown in FIG. 2B, the stop moves upward 52 from the blocking position to a released position 51' to allow the leading article 14' to pass. At the same time, the bearing surface 48' is raised into contact with the rollers to propel the accumulated articles forward. The rotating rollers accelerate the leading article 14' forward, separating it from the trailing articles and leaving a space 56 between the leading article and the trailing articles. The stop can be moved back to the blocking position through the space before the next accumulated article 14" exits the article-accumulating zone. Of course, the stop may remain in the released position, coordinated with the bearing surface in the raised position, to allow as many articles as required to pass before returning to the blocking position. When accumulation resumes, the bearing surface is lowered as shown in FIG. 2C. The stop may be raised and lowered vertically, as shown, or may be moved laterally between the blocking position and the release position, as another example, by means of actuators of the kind used for the bearing surface. In this way, a single conveyor belt may be continuously driven in the direction of belt travel, without stopping or starting, to provide an acceleration-and-release conveyor.

Figure 3A:
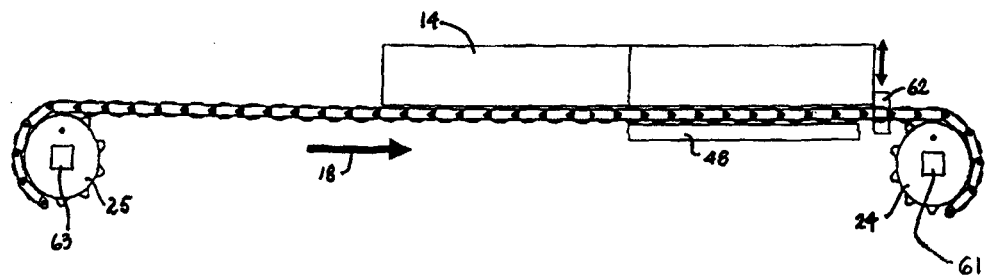
FIGS. 3A and 3B are a side elevation view and a larger-scale top plan view of another version of an accumulation-and-release conveyor embodying features of the invention, including a pair of parallel roller belts.
Figure 3B:
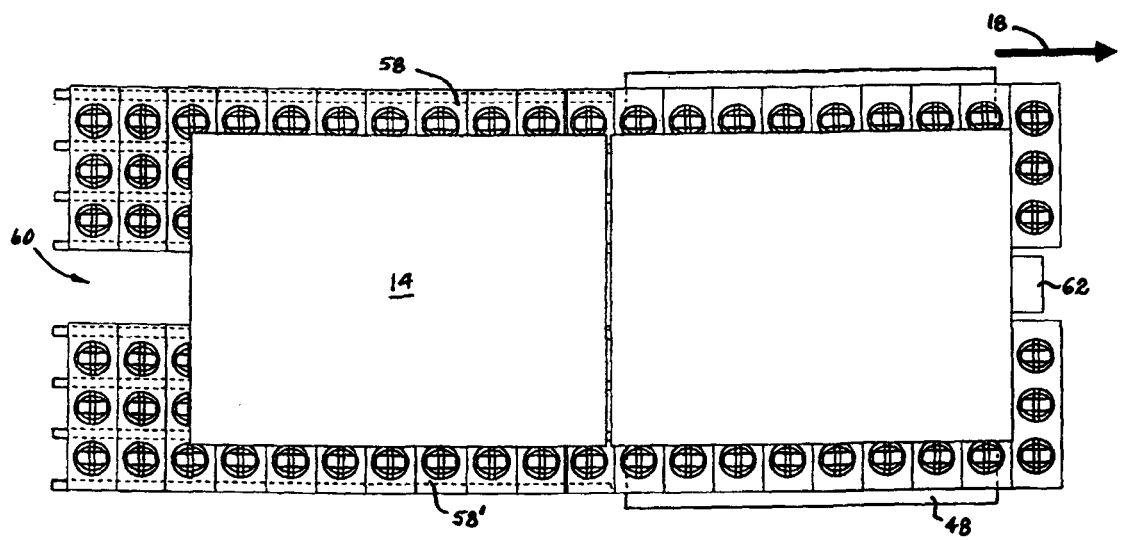

Another version of an accumulation-and-release conveyor is shown in FIGS. 3A and 3B. This conveyor uses a pair of parallel roller belts 58, 58' separated across an intervening gap 60. Both belts advance in the direction of belt travel 18 at the same speed and may be mounted on sprocket sets 24, 25 on common drive and idle shafts 61, 63. Articles 14 conveyed atop the rollers span the gap with a portion supported on each belt. The gap between the conveyors allows a movable stop 62 to be lowered through the gap from a raised blocking position to a release position below the inner surfaces of the belts. This is preferable to a release position above the belt if overhead space is limited. In all other respects, the conveyor of FIGS. 3A and 3B operates the same as the conveyor of FIGS. 1 and 2 in accumulating articles upstream of the stop in an article-accumulation zone and in releasing articles off the downstream end of the conveyor accelerated on an underlying bearing surface 48 selectively moved into contact with the rollers as the belts advance together continuously in the direction of belt travel.

Figure 4:
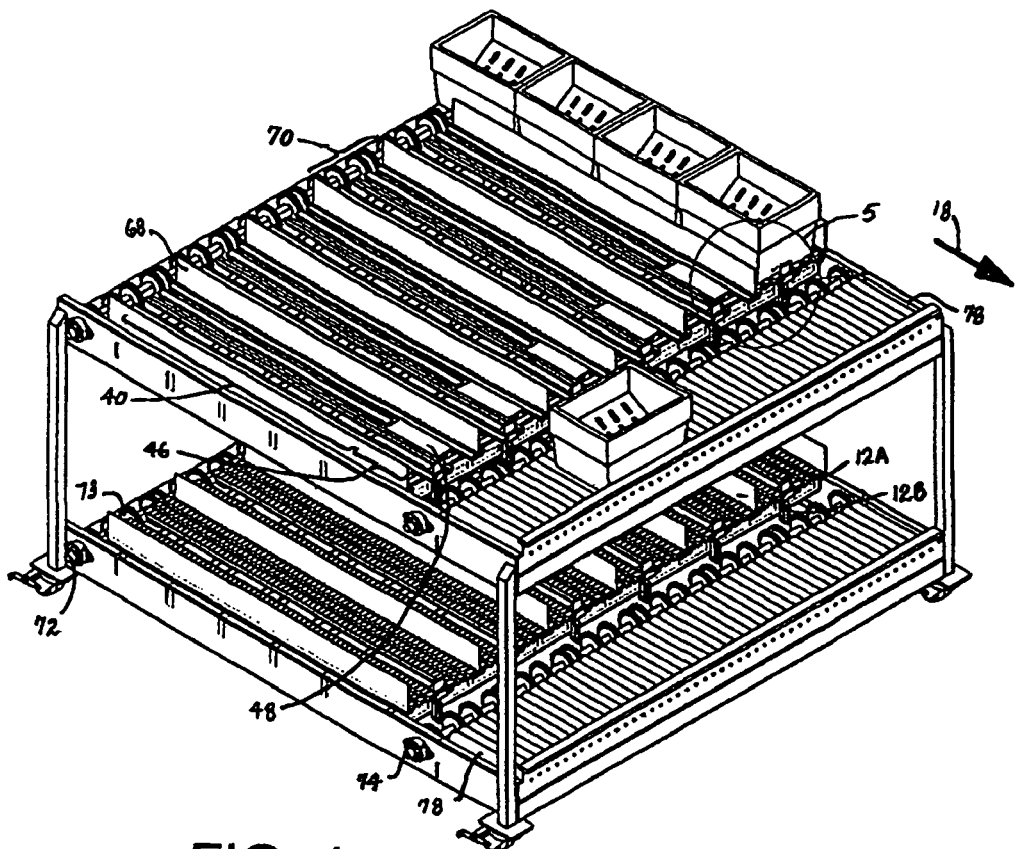
FIG. 4 is an isometric view, partly cut away, of a conveyor system using a plurality of side-by-side conveyors as in FIGS. 3A and 3B to supply articles to a takeaway roller conveyor.
Figure 5:
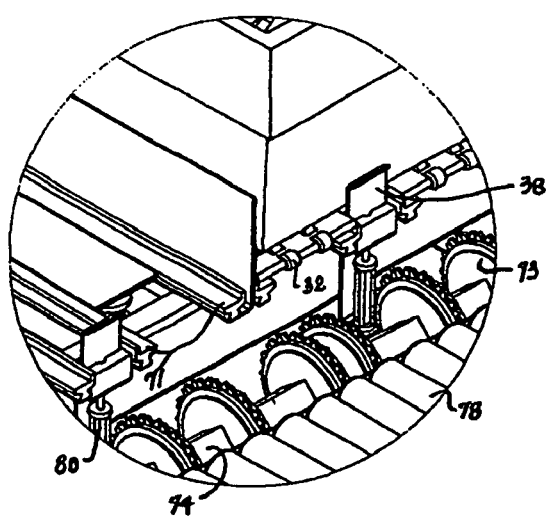
FIG. 5 is an expanded view of a portion of the conveyor system of FIG. 4.

FIG. 4 depicts a bi-level six-lane accumulation-and-release conveyor system using six dual-belt conveyors as in FIGS. 3A and 3B on each level. Each lane is constructed of two conveyor belts 12A and 12B arranged side by side. The belts are supported on flanking rails 71 and separated by dividers 68 so that each belt forms an individual article-conveying lane 70 extending from the upstream end to the downstream end. Like the conveyor of FIGS. 3A and 3B, this multi-lane conveyor has an upstream free-rotation zone 40 and a downstream selectable article-acceleration zone 46 underlain by a retractable bearing surface 48 on which the belt rollers 32 can roll. Independently movable stops 38 are positioned at the downstream end of each lane. The stops are selectively raised and lowered by actuators 80, such as pistons. All the belts in each level are trained between drive and idle sprockets 73 or drums mounted on common idle 72 and drive shafts 74 at opposite ends of the conveyor. A drive motor (not shown) coupled to the common drive shaft is used to drive all the belts on each level at the same speed in the direction of belt travel 18. Alternatively, the parallel belts of FIG. 4 may be replaced by a single wide belt divided into parallel lanes by dividers positioned just above the belt's article-conveying surface. Articles accelerated off the downstream end of the belts are deposited on a takeaway conveyor, such as a powered roller conveyor 78 arranged perpendicular to the accumulation-and-release conveyor belts.

The stops and the bearing surfaces may be controlled manually, by a simple timer, or by a controller receiving inputs from a variety of article sensors positioned along the conveying lines. By coordinating the activation of the stops and the rollers, the controller can control the feeding of articles from the lanes to adjust the spacing between consecutive articles on the takeaway conveyor, to prevent the individual conveyors from overflowing, or to meet other criteria.

Although the invention has been described in detail with respect to a few preferred versions, other versions are possible. For example, the belt may instead be a flat belt or a metal belt or chain. The roller bearing surface, depicted as a flat bed, may be a series of parallel bearing surfaces, each underlying a column of rollers in the article-acceleration zone. The rollers may be integrally formed with axles or axle stubs whose opposite ends are received rotatably in openings in the interior of the body of the belt. Furthermore, the stop and the bearing surface could be positioned at any place along the length of the conveyor, not just at the downstream end. And the bearing surface or another bearing surface could extend downstream of the stop position as well. As yet another example, the roller belts may be selectively stopped and started instead of continuously run. So, as these few examples suggest, the scope of the claims is not meant to be limited to the preferred versions.

What is claimed is:
1. A conveyor comprising:
a conveyor belt advancing in a direction of belt travel from an upstream end to a downstream end, wherein the conveyor belt includes a plurality of rollers extending through the thickness of the conveyor belt and rotatable in the direction of belt travel;
a movable stop positioned along the conveyor;
a first actuator coupled to the movable stop to move the movable stop between a blocking position blocking conveyed articles and a release position allowing articles to pass;

a movable bearing surface disposed below the conveyor belt in a carryway zone extending proximate to and upstream from the movable stop;

a second actuator movable into and out of contact with the rollers from below to cause the rollers to rotate by frictional rolling contact with the bearing surface when in contact with the rollers as the conveyor belt advances;

wherein the rollers in the conveyor belt not contacting the bearing surface are freely rotatable; and wherein the operation of the first and second actuators is coordinated so that the movable bearing surface is in contact with the rollers when the movable stop is in the release position to propel articles downstream past the movable stop in the release position and wherein the movable bearing surface is out of contact with the rollers when the movable stop is in the blocking position to allow blocked articles to accumulate under the freely rotatable rollers upstream of the stop in the blocking position with low back line pressure.

2. A conveyor as in claim 1 further comprising a second conveyor belt including a plurality of rollers extending through the thickness of the second conveyor belt and rotatable in the direction of belt travel wherein both conveyor belts advance from the upstream end to the downstream end in the direction of belt travel in parallel across an intervening gap and are operated to simultaneously convey an article spanning the gap.

3. A conveyor as in claim 2 wherein the movable stop moves through the gap.

4. A conveyor as in claim 1 wherein the movable stop and the movable bearing surface are disposed at the downstream end of the conveyor.

5. A conveyor as in claim 1 wherein the conveyor belt further includes axles retained in the belt perpendicular to the direction of belt travel and wherein the rollers are rotatable on the axles.

6. A conveyor as in claim 1 wherein the rollers on the conveyor belt are arranged in columns and further comprising belt support rails underlying the conveyor belt upstream of the movable stop in supporting contact with the conveyor belt between the columns of rollers.

7. A conveyor as in claim 1 further comprising:
one or more lane dividers disposed above the conveyor belt to divide the conveyor belt into parallel lanes extending in the direction of belt travel from the upstream end to the downstream end; and
one or more additional movable stops, disposed one stop per lane.

8. A conveyor as in claim 1 further comprising:
one or more conveyor belts as in claim 1 arranged in parallel to form parallel article-conveying lanes;
a movable stop for each article-conveying lane;
a common drive for all the conveyor belts to advance the conveyor belts in the direction of belt travel in parallel.

9. A method for conveying articles on a conveyor, comprising:
conveying articles atop article-supporting rollers disposed in and extending through the thickness of a conveyor belt advancing in a direction of belt travel upstream to downstream;
selectively moving a stop to block and release articles conveyed atop the rollers in the conveyor belt at a stop position along the conveyor;
selectively moving a bearing surface disposed below the conveyor belt into contact with the rollers in a carryway zone extending proximate to and upstream from the stop position to cause the rollers in contact with the bearing surface from below to propel articles atop the rollers forward along the advancing conveyor belt or out of contact with the rollers in the carryway zone to allow the rollers to rotate freely; and
coordinating the movement of the bearing surface with the movement of the stop so that the bearing surface is in contact with the rollers when the stop is releasing articles at the stop position to propel articles downstream past the stop position and so that the bearing surface is out of contact with the rollers to make the rollers freely rotatable when the stop is blocking articles at the stop position to allow blocked articles to accumulate under the freely rotatable rollers upstream of the stop with low back line pressure.

* * * * *